US012503609B2

(12) United States Patent
Nair et al.

(10) Patent No.: US 12,503,609 B2
(45) Date of Patent: Dec. 23, 2025

(54) NON-FOAMED COATED TEXTILE AND METHOD OF MAKING

(71) Applicant: Eastman Kodak Company, Rochester, NY (US)

(72) Inventors: Mridula Nair, Penfield, NY (US); Ellen M. Pyszczek, LeRoy, NY (US); Joseph Salvatore Sedita, Albion, NY (US); Mary Christine Brick, Webster, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 924 days.

(21) Appl. No.: 17/720,380

(22) Filed: Apr. 14, 2022

(65) Prior Publication Data
US 2023/0002621 A1 Jan. 5, 2023

Related U.S. Application Data

(60) Provisional application No. 63/217,825, filed on Jul. 2, 2021.

(51) Int. Cl.
| C09D 5/03 | (2006.01) |
| C09D 5/18 | (2006.01) |
| C09D 7/40 | (2018.01) |
| C09D 7/41 | (2018.01) |
| C09D 7/48 | (2018.01) |
| C09D 7/61 | (2018.01) |
| C09D 127/06 | (2006.01) |
| C09D 127/08 | (2006.01) |
| D06M 15/248 | (2006.01) |
| D06M 15/263 | (2006.01) |
| D06M 23/04 | (2006.01) |

(52) U.S. Cl.
CPC ............ *C09D 5/033* (2013.01); *C09D 5/032* (2013.01); *C09D 5/18* (2013.01); *C09D 7/41* (2018.01); *C09D 7/48* (2018.01); *C09D 7/61* (2018.01); *C09D 7/69* (2018.01); *C09D 127/06* (2013.01); *C09D 127/08* (2013.01); *D06M 15/248* (2013.01); *D06M 15/263* (2013.01); *D06M 23/04* (2013.01)

(58) Field of Classification Search
None
See application file for complete search history.

(56) References Cited

U.S. PATENT DOCUMENTS

| 4,587,997 | A | | 5/1986 | Brooks | |
| 5,339,883 | A | * | 8/1994 | Colson | E06B 9/262 |
| | | | | | 160/84.05 |
| 6,032,454 | A | | 3/2000 | Damour et al. | |
| 7,754,409 | B2 | | 7/2010 | Nair et al. | |
| 8,252,414 | B2 | | 8/2012 | Putnam et al. | |
| 9,920,458 | B2 | | 3/2018 | Damour, Jr. | |
| 10,145,061 | B1 | | 12/2018 | Herrick et al. | |
| 10,927,483 | B2 | | 2/2021 | Sedita et al. | |
| 11,272,203 | B2 | * | 3/2022 | Li | H04N 19/573 |
| 2020/0172744 | A1 | | 6/2020 | Brick et al. | |
| 2020/0173067 | A1 | | 6/2020 | Sedita et al. | |
| 2020/0173099 | A1 | | 6/2020 | Nair et al. | |

FOREIGN PATENT DOCUMENTS

| JP | 4677781 | B2 | 4/2011 |
| JP | 5022597 | B2 | 9/2012 |

* cited by examiner

*Primary Examiner* — Lynda Salvatore
(74) *Attorney, Agent, or Firm* — J. Lanny Tucker

(57) ABSTRACT

A non-foamed aqueous composition can be applied to fabric substrates to provide non-foamed light-attenuating coatings in resulting coated fabric substrates that produce reduced glare from incident outside light. The non-foamed aqueous composition used to make these coated fabric substrates has a 5-50% solids and a zero shear viscosity of 100-1000 mPa-sec at 25° C. This composition has components i) through iv): i) porous particles at 0.1-20 weight %, and optionally an opacifying colorant; ii) a film-forming binder material comprising at least a chlorinated polymer at 4-20 weight %; iii) a white inorganic particulate filler material having a refraction index (RI) greater than 2 and a median particle size of less than 1 μm, at 5-16 weight %; and iv) a white low-density particulate hydrated alumina having a median particle size of less than or equal to 3 μm, at 2-16 weight %.

12 Claims, No Drawings

NON-FOAMED COATED TEXTILE AND METHOD OF MAKING

RELATED APPLICATIONS

This application also has a priority from provisional application U.S. Ser. No. 63/217,825 that was filed Jul. 2, 2021.

Reference is also made to the following copending and commonly assigned patent application:

U.S. Publication No. 2023/0009779 filed on Apr. 14, 2022, by Nair and Brick and entitled "Non-foamed Aqueous Composition", the disclosure of which is incorporated herein by reference, which also has a priority from provisional application U.S. Ser. No. 63/217,824 that was filed Jul. 2, 2021.

FIELD OF THE INVENTION

This invention relates to the use of non-foamed aqueous compositions that can be applied to woven fabric substrates derived from coated yarns containing fiberglass strands, to make coated fabric substrates that are useful as textiles for reducing excessive brightness from sunlight, for example, coming into a room or cabin through windows, skylights, and doors. Such non-foamed aqueous compositions are applied generally to only one side of such fabric substrates to reduce light glare inside the room or cabin. The non-foamed aqueous compositions contain porous particles, a film-forming binder material including at least a chlorinated polymer, a white inorganic filler material having a refractive index greater than 2, and a white low-density particulate hydrated alumina.

BACKGROUND OF THE INVENTION

Windows are the most common way to admit light into a room. Other ways light can be streamed into a space is through light-transmitting fenestration such as skylights and glass doors. In general, at least for windows, various window treatments such as antiglare films, woven shades, roller blinds, and drapes can be used to modulate the nature of light entering the space to maximize visual comfort and to reduce energy use in air-conditioned spaces. Unlike antiglare films, rolling solar shades and other textile treatments are more versatile as they can be opened or closed as needed and they come in a variety of colors and geometric shapes.

High-end window treatments such as roller shades or screens are designed to provide a level of privacy from the outside while maintaining a good view of the outside environment from within the room. During daytime hours, this requires very good control of glare caused by bright sunlight coming into a room. Light coloration of window treatments lets more light through causing higher glare while darker window treatments absorb more light coming through, reducing glare. Moreover, in order to maintain a high level of privacy, it is imperative to block the view from outside looking in. An advantage of light coloration in window treatments, especially for the street side is that it increases glare and reflection for a viewer looking in, thereby increasing privacy.

High-efficiency window shades are intended to control heat and glare for a chosen coloration. Materials having such properties are marketed by MERMET as E Screen™ materials and are available as a variety of woven vinyl coated fiberglass fabric with a range of Openness Factors (OF, the percentage of open holes in a material or the number of open holes per square inch). The tighter the weave, the lower the openness and the material blocks more incident light. The more incident light is blocked, the more the views from the inside and outside are blocked. Such window shades come in several neutral shades from white to charcoal black. The goal, however, is to provide privacy from the street side while maintaining a good view of the outside from the inside, using a higher Openness Factor for all shade colorations.

Such high-efficiency window shade materials can be designed using yarns having a multifilament core that can be clad or coated with a flame retardant polymeric plastisol or other chemicals, for example as described in EP Patent 0 900 294B1 (Damour et al.) and U.S. Pat. No. 9,920,458 (MERMET). For example, the described multifilament core can be composed on multiple strands of fiberglass and clad with a poly(vinyl chloride) plastisol in mixture with inorganic flame retardants such as zinc borate, or oxides of aluminum, magnesium, zinc, tin, and lead.

One use for such fabrics is as window shades for installation into commercial sites. Synthetic woven fabrics consisting of bonded PVC-coated polyester and fiberglass yarns are also described in U.S. Pat. No. 4,587,997 (Brooks) and U.S. Pat. No. 6,032,454 (Damour et al.). Such fiberglass core yarns with plastic coatings are considered to provide durability and dimensional stability.

U.S. Patent Application Publication 2020/0173067 (Sedita et al.) describes fabric substrates made using yarns having fiberglass cores. Such fiberglass cores are coaxially coated with a composition containing organic porous particles, a film-forming binder, and a relatively soft inorganic filler (MOHS value less than 5). Such compositions do not contain opacifying colorants such as carbon black. By applying this composition to the fiberglass core of the yarn, the resulting fabric substrates demonstrate increased opacity and glare control over those previously known in the art.

Despite the advances provided in the technical field of yarns and textiles produced therefrom as described above, there is a further need to improve the quality of solar irradiance control of white or near white woven textiles designed as window screens, and to further reduce glare inside a room from incident outside light for improved view from the inside, especially when the fabrics are composed of yarns that comprise multifilament fiberglass. It is also needed to reduce the inside glare while reflectance and glare on the "street side" are undiminished to foster privacy from those looking into the room. There is a further need for coated formulations that can reduce inside glare without degrading the original visual appearance and coloration of the window treatment, or changing the openness of the weave.

SUMMARY OF THE INVENTION

The present invention provides a method of making a coated fabric substrate, comprising:
A) providing a fabric substrate comprising a plurality of core yarns, all woven together, wherein at least some of the plurality of core yarns comprise fiberglass, which fabric substrate has a first side and a second side; and
B) forming a non-foamed light-attenuating coating on at least the first side of the fabric substrate from a non-foamed aqueous composition having a density of greater than 0.8 $g/cm^3$, to provide the coated fabric substrate, which non-foamed light-attenuating coating, and comprises components i) through iv):

i) porous particles present in an amount of at least 0.5 weight % and up to and including 40 weight %, each porous particle comprising a continuous polymeric phase and discrete pores dispersed within the continuous polymeric phase, having a mode particle size of at least 2 µm and up to and including 50 µm, and optionally comprising an opacifying colorant in an amount of up to and including 1 weight %, the amount of the opacifying colorant being based on the total weight of the i) porous particles;

ii) a film-forming binder material comprising at least a chlorinated polymer, which ii) film-forming binder material is present in an amount of at least 15 weight % and up to and including 50 weight %;

iii) a white inorganic particulate filler material having a refractive index (RI) greater than 2 and median particle size of less than 1 µm, the iii) inorganic particulate filler material being present in an amount of at least 8 weight % and up to and including 40 weight %; and iv) a white low-density particulate hydrated alumina having a median particle size of less than or equal to 3 µm, and being present in an amount of at least 10 weight % and up to and including 50 weight %, all amounts of the i), ii), iii), and iv) components being based on the total weight of the non-foamed light-attenuating dry coating.

Moreover, the present invention provides a coated fabric substrate using the inventive method, the coated fabric substrate comprising a plurality of core yarns, all woven together, wherein at least some of the plurality of core yarns comprise fiberglass, which fabric substrate has a first side and a second side, and a non-foamed light attenuating coating disposed on the first side of the fabric substrate, which non-foamed light attenuating coating comprises components i) through iv):

i) porous particles present in an amount of at least 0.5 weight % and up to and including 40 weight %, each porous particle comprising a continuous polymeric phase and discrete pores dispersed within the continuous polymeric phase, having a mode particle size of at least 2 µm and up to and including 50 µm, and optionally comprising an opacifying colorant in an amount of up to and including 1 weight %, the amount of the opacifying colorant being based on the total weight of the i) porous particles;

ii) a film-forming binder material comprising at least a chlorinated polymer, which ii) film-forming binder material is present in an amount of at least 15 weight % and up to and including 50 weight %;

iii) a white inorganic particulate filler material having a refractive index (RI) greater than 2 and a median particle size of less than 1 µm, the iii) white inorganic particulate filler material being present in an amount of at least 8 weight % and up to and including 40 weight %; and iv) a white low-density particulate hydrated alumina having a median particle size of less than or equal to 3 µm, and being present in an amount of at least 10 weight % and up to and including 50 weight %, all amounts of the i), ii), iii), and iv) components being based on the total weight of the non-porous light attenuating coating.

The present invention provides a treatment for fabric substrates such as textile fabrics derived from yarns having multifilament fiberglass in the yarn cores. Once a textile fabric is made, the non-foamed aqueous composition according to this invention can be applied in a suitable manner to one or both of its sides or outer surfaces, and preferably on a single side, to reduce glare on the inside of a room from incident light, especially sunlight, coming from outside the room. Thus, the formed and generally dry coating becomes light-attenuating particularly to reduce glare from incident sunlight, while providing privacy from an outside source.

The inventive non-foamed aqueous composition solves problems noted above because of the presence of i) porous particles that can opacify visible light coming into the room by their use in woven fiberglass-containing yarns, ii) a film-forming binder material comprising at least a chlorinated polymer that acts as a binder for the components of the non-foamed light attenuating coating and provides adhesion to the woven yarns, a relatively high refractive index iii) inorganic particulate filler material that adds to the lightness of the coloration, and iv) a white low-density particulate hydrated alumina that acts as a filler and confers flame retardancy and lightness of coloration, as described below.

This invention can be used to provide coated fabric substrates having a dry non-foamed light-attenuating coating on at least on one side thereon without noticeably degrading the OF or the open holes in the fabric material, and that can be fabricated for window and other glass covered light transmitting fenestration treatments, in the form of roller shades, solar screens, signage, and the like to control light coming into a space or room.

DETAILED DESCRIPTION OF THE INVENTION

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure has broader application than is explicitly described for any specific embodiment.

Definitions

As used herein to define various components of the non-foamed aqueous composition, fabric substrate materials, or materials used to prepare the porous particles, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered to be approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

The terms "porous particle" and "porous particles" are used herein, unless otherwise indicated, to refer to porous organic polymeric materials described below in more detail. The porous particles generally comprise a solid continuous polymeric phase having an external particle surface and discrete pores dispersed within the continuous polymeric phase. The continuous polymeric phase also can be chemically crosslinked or elastomeric in nature, or both chemically crosslinked and elastomeric in nature.

The i) porous particles can include "micro," "meso," and "macro" discrete pores, which according to the International Union of Pure and Applied Chemistry, are the classifications recommended for discrete pore sizes of less than 2 nm, from 2 nm to 50 nm, and greater than 50 nm, respectively. Thus, while the i) porous particles can include closed discrete pores of all sizes and shapes (that is, closed discrete pores entirely within the continuous polymeric phase) providing a suitable volume in each discrete pore, macro discrete pores are particularly useful. While there can be open macro pores on the surface of the i) porous particle, such open pores are not desirable and can be present only by accident. The size of the i) porous particles, their formulation, and manufacturing conditions are the primary controlling factors for discrete pore size. However, typically the discrete pores independently have an average size of at least 100 nm and up to and including 7,000 nm, or more likely at least 200 nm and up to and including 2,000 nm. Whatever the size of the discrete pores, they are generally distributed randomly throughout the continuous polymeric phase.

When used in describing certain particulate sizes, the term "median particle size" has the standard definition known in the art, for example, referring to the $d_{50}$ size of a particle size distribution.

Openness Factor (OF) refers to, the percentage of open holes in a fabric construction per area, and is sometimes referred to as "weave density." The lower the OF, the greater the visible light that is obstructed, scattered, or blocked, which in turn depends on the spacing and dimension of the yarn.

Different types of window treatments along with the window glass used can affect the amount of light transmission through windows.

Total visible reflection (TVR), according to the present invention, refers to the percentage of measured visible light at normal incidence that is diffusely reflected off a woven fabric facing the street-side. TVR can be measured, for example, as described below in the 400-700 nm wavelength range using a Hunter Labs UltraScan XE spectrophotometer equipped with an integrating sphere, a pulsed Xenon light source, and a solid-state diode array detector.

Total visible transmission (TVT), according to the present invention, refers to the percentage of measured visible light at normal incidence directly transmitted through a screen into the inside of a room. This is a measure of how much visible light is admitted into the room by a woven fabric substrate used as the window treatment. TVT can be measured, for example, as described below in the 400-700 nm wavelength range using a Perkin-Elmer Lambda 800 UV-Vis spectrophotometer.

Diffuse visible transmission (DVT), according to the present invention, refers to the percentage of visible light transmitted through a yarn from the street-side that does not directly pass through the open holes of the fabric substrate, including light reflected off the sides of the translucent woven yarn that surround the open holes. The lower this value, the lower the light glare in a room. DVT can be measured as described below, for example, similarly to measurement of TVT, but using a light trap to collect all of the non-scattered light.

The non-scattered visible transmission (NVT) according to the present invention is the percentage of light that passes only through the open areas of the fabric weave and not through the fibers of the fabric. NVT can be estimated by subtracting DVT from TVT and therefore can be related to how tight the weave is in a fabric substrate and in turn, reduce the OF.

Whiteness Index (WI) is a measure that correlates the visual ratings of whiteness for certain white and near-white surfaces. The American Standards Test Methods (ASTM) E313-10 has defined whiteness index and is used for measuring near-white, opaque materials such as paper, paint, and plastic materials, or for measuring any material whose color (coloration) appears white.

CIELAB L*, a*, and b* values described herein have the known definitions according to CIE 1976 color space or later known standard versions of color space and were calculated using the power distribution function for a standard D65 illuminant and the 10° Standard Observer function. These calculated values can be used to express a color as three numerical color values: L* for the lightness (or brightness) of the color, a* for the green-red component of the color, and b* for the blue-yellow component of the color.

Refractive index (RI) or index of refraction refers to the known property of the measure or the extent of a material's ability to bend light as the light passes from one medium to another, or through an interface. The refractive indices of many materials in nature are well known and reported in the literature.

Glass transition temperatures of the organic polymers used to prepare either the continuous polymeric phase, or the ii) film-forming binder materials described below, can be measured using Differential Scanning Calorimetry (DSC) using known equipment and procedures. For many commercially available organic polymers, the glass transition temperatures are known from commercial suppliers.

As used herein, a "yarn" is a continuous length of interlocked fiber strands. Yarns are classified according to their structure into three basic categories: staple fiber yarns are made of several short staple fibers that are wound together; ply yarns are made of one or more strands of staple fiber yarns; a single ply yarn is a single strand of staple fibers held together by twisting. Multi-ply yarns are made of multiple single yarns twisted together. Filament yarn is made of one or more continuous strands that run the entire length of the yarn and are longer than staple fibers. Multiple filaments can be woven together or intertwined in a suitable manner or arranged together as a bundle with or without intertwining.

As used herein, a "coated yarn" is a yarn that has a "yarn core" on which a coating is disposed as described in detail below.

As used herein, the terms "fabric," "textile," and "fabric substrate" are meant to refer to materials can be or prepared according to the present invention, of any desirable diameter or length.

Uses

The non-foamed aqueous compositions according to this invention can be used to prepare various coated fabric substrates (coated textiles) having the properties described above. Such coated (or treated) fabric substrates can be used as, for example, curtains and other window treatments, window blinds, room dividers, cubicle curtains, and banners. Coated fabric substrates can optionally have a printable outer surface that is able to accept ink used in screen printing, gravure printing, inkjet printing, thermal imaging (such as "dye sublimation thermal transfer"), or other imaging processes.

Non-Foamed Aqueous Compositions

The inventive non-foamed aqueous compositions generally have a % solids of at least 5% or at least 25% and up to and including 40% or up to and including 50%. The formulation can be designed with a desired % solids in order to facilitate a desired means for applying to a fabric substrate, as described below. In some embodiments, the % solids is optimized for application using spray coating as described below.

Moreover, the inventive non-foamed aqueous compositions typically are shear thinning and exhibit a zero shear viscosity (measured at very low shear rates and displays the viscosity of a material at rest) of at least 100 mPa-sec or at least 500 mPa-sec, and up to and including 750 mPa-sec or up to and including 1000 mPa-sec, all measured at 25° C. using a frequency sweep using commercially available rheological equipment and procedures (for example, using an Anton Pair MCR 501 instrument as described below for the working examples. "Zero shear viscosity" is a term known in the art as described for example, referring to the viscosity plateau prior to the onset of shear thinning. This phenomenon could occur at very low shear rates, but for certain materials it can still also occur at very high shear rates.

It is essential that there be minimal air bubbles (or other gaseous voids) in the non-foamed aqueous composition since air bubbles can reduce the uniformity of coating or application to a fabric substrate or they can allow light passage through the dry coating, and thereby diminish the light-attenuating properties of the resulting dry coatings. As noted below, to minimize or prevent foaming of the non-foamed aqueous composition, it can include a water-soluble or water-dispersible v) defoaming agent or anti-foaming agent described below in an appropriate amount, but such components may not be essential in every embodiment. However, in general, it is desired that the non-foamed aqueous composition has a density (or "foam density") of greater than 0.8 g/cm$^3$ or greater than 0.9 g/cm$^3$.

In many embodiments, the non-foamed aqueous composition according to this invention contains four essential components, all defined below: i) porous particles; ii) film-forming binder material; iii) white inorganic particulate filler material; and iv) white low-density particulate hydrated alumina.

For the method described below in which coated fabric substrates are prepared according to the present invention, the inventive non-foamed aqueous composition is used to form or provide a non-foamed light-attenuating coating on a fabric substrate.

i) Porous Particles:

Each of the i) porous particles useful in the non-foamed aqueous composition comprises a continuous polymeric phase and discrete pores distributed within the continuous phase and has a mode particle size of at least 2 μm and up to and including 50 μm. The i) porous particles can be prepared using one or more water-in-oil emulsions in combination with an aqueous suspension process, such as in the Evaporative Limited Coalescence (ELC) process. The details for the preparation of i) porous particles and their common properties are provided, for example, in U.S. Pat. No. 8,110,628 (Nair et al.), U.S. Pat. No. 8,703,834 (Nair), 7,754,409 (Nair et al.), 7,887,984 (Nair et al.), 8,329,783 (Nair et al.), and 8,252,414 (Putnam et al.), the disclosures of all of which are incorporated herein by reference. Thus, each porous particle is generally polymeric and organic in nature (that is, the continuous polymeric phase is polymeric and organic in nature) and non-porous particles (having less than 20 volume % porosity) are generally excluded for use in the present invention.

Unlike the porous particles used in the multifilament cladding described below, it is possible that the i) porous particles used according to the present invention can contain a certain amount of one or more opacifying colorants described in more detail below.

Each of the i) porous particles generally has a porosity of at least 20 volume % or of at least 35 volume % and up to and including 65 volume % or up to and including 70 volume %, or more typically a porosity of at least 40 volume % and up to and including 60 volume %, all based on the total porous particle volume. Porosity can be measured using the mercury intrusion technique using equipment and procedures that would be readily apparent to one skilled in the art of polymer and physical chemistry.

The i) porous particles can be composed of a continuous polymeric phase derived from one or more organic polymers that are chosen so that the continuous polymeric phase has a glass transition temperature ($T_g$) of at least 25° C., or more typically of at least 25° C. and up to and including 180° C., as determined using Differential Scanning Calorimetry using known equipment and procedures.

The continuous polymeric phase can comprise one or more organic polymers having the properties noted above that comprise generally at least 70 weight % and up to and including 100 weight % based on the total weight of the continuous polymeric phase. In some embodiments, the continuous polymeric phase is composed of one or more cellulose polymers (or cellulosic polymers) including but not limited to, those cellulosic polymers derived from one or more of cellulose acetate, cellulose butyrate, cellulose acetate butyrate, and cellulose acetate propionate. Details about such polymers are provided, for example, in U.S. Pat. No. 9,963,569 (Nair et al.), the disclosure of which is incorporated herein by reference.

Other useful polymers for composing the continuous polymeric phase are described in the incorporated Nair, Nair et al., and Putnam et al. patents noted above so the known details are omitted here. Mixtures of one or more of such polymers with one or more of the cellulose polymers described above can also be used.

The continuous polymeric binder of the i) porous particles can also be derived from ethylenically unsaturated polymerizable monomers and polyfunctional reactive compounds as described for example in U.S. Pat. No. 8,703,834 (noted above).

In general, the i) porous particles used in the present invention have a mode particle size equal to or less than 50 μm, or of at least 2 μm and up to and including 50 μm, or typically of at least 3 μm and up to and including 30 μm or even up to and including 40 μm. Most useful i) porous particles have a mode particle size of at least 3 μm and up to and including 20 μm. Mode particle size is a known parameter and represents the most frequently occurring diameter for spherical particles and the most frequently occurring largest diameter for the non-spherical particles in a particle size distribution histogram, which can be determined using known equipment (including light scattering equipment such as the Sysmex FPIA 3000 Flow Particle Image Analyzer that used image analysis measurements and that can be obtained from various sources including Malvern Panalytical; and coulter counters and other particle characterizing equipment available from Beckman Coulter Diagnostics), software, and procedures.

The i) porous particles can be provided as powders, or as aqueous suspensions (including water or water with water-miscible organic solvents such as alcohols). Such powders and aqueous suspensions can also include surfactants or suspending agents to keep the i) porous particles suspended or to facilitate rewetting them in an aqueous medium.

The i) porous particles can be present in the non-foamed aqueous compositions according to the present invention in an amount of at least 0.1 weight % or of at least 5 weight %, and up to and including 15 weight % or up to and including 20 weight %, all based on the total weight of the non-foamed aqueous composition.

As discussed in more detail below, some i) porous particles can comprise one or more opacifying colorants (defined below), while other i) porous particles do not. Mixtures of i) porous particles with and without opacifying colorants can be used, and the different i) porous particles can be composed of the same or different polymeric materials and have the same or different mode particle sizes and porosities.

Some particularly useful optional components are what are identified herein as "opacifying colorants" that can be used as a single colorant material or chosen from any suitable combination of colorants such that the single or multiple colorants form the "opacifying colorant" that absorbs predetermined electromagnetic radiation (typically from UV to near-IR, for example, from 350 nm to 800 nm, or from 350 nm to 700 nm). Opacifying colorants can be soluble dyes or pigments or combinations of each or both types of materials.

When present, one or more opacifying colorants can be present within a volume of discrete pores within some or all of the i) porous particles or within the continuous polymeric binder of the i) porous particles, or within both the volume of the discrete pores and the continuous polymeric binder of the i) porous particles. This is highly advantageous as the i) porous particles can be used to "encapsulate" various opacifying colorants as well as tinting colorants and other additives so they are kept isolated from the other components of the non-foamed aqueous composition and are additionally not exposed to the environment. However, in some embodiments, it can be useful to incorporate opacifying agents solely or additionally within the ii) film-forming binder material in which the i) porous particles are dispersed.

As used herein, an opacifying colorant includes one or more colorant materials that are chosen, individually or in combination, to provide blocking of predetermined electromagnetic radiation (as defined above). While the opacifying colorants can provide some coloration or desired hue, they are not purposely chosen for this purpose and are thus materials that are chosen to be different from any tinting colorants included within the non-foamed aqueous composition especially since the opacifying colorants are within the i) porous particles.

Examples of opacifying colorants that can be used individually or in combination include but are not limited to, neutral or black pigments or dyes, carbon blacks, black iron oxide, graphite, aniline black, anthraquinone black, and combinations of colored pigments or dyes chosen from cyan, magenta, yellow, green, orange, blue, red and, and violet dyes or pigments, and infrared absorbing pigments or dyes. The present invention is not limited to using only the specific opacifying colorants described herein but these are considered as representative and as suitable guidance for a skilled worker to devise other combinations of opacifying colorants for the desired absorption of the predetermined electromagnetic radiation. A carbon black is particularly useful as an opacifying colorant, especially when present in the discrete pores of the i) porous particles, of which there are many types of carbon black available from commercial sources. Combinations of dyes or pigments such as a combination of the subtractive primary colored pigments (cyan, magenta, and yellow colored pigments) can also be used to provide a "black" or visually neutral opacifying colorant.

The opacifying colorant can be generally present in the non-foamed aqueous composition in an amount of up to 1 weight %, or more likely in an amount of at least 0.005 weight % and up to and including 1 weight %, all based on the total weight of the i) porous particles in the non-foamed aqueous composition (and a resulting non-foamed light-attenuating coating). Mixtures of the noted opacifying colorants can be used if desired and these amounts also refer to the total amount of a mixture of opacifying colorants. For example, as noted above, an opacifying colorant can comprise a combination of two or more component colorants (such as a combination of dyes or a combination of pigments) designed in hues and amounts so that the combination meets the desired properties described herein.

In addition, different i) porous particles can contain different opacifying colorants as long as the total amount meets the noted ranges above. Moreover, some i) porous particles can contain opacifying colorant(s) while other i) porous particles can contain no opacifying colorants, and such different i) porous particles can be used alone or in combination.

In some embodiments, the opacifying colorants, if in pigment form, are generally milled to a fine particle size and then encapsulated within the volume of the discrete pores of the porous particles by incorporating the milled pigment within an aqueous phase used in making the porous particles. Alternatively, the opacifying colorant can be incorporated within the continuous polymeric phase of the porous particles by incorporating the opacifying colorant in the oil phase used in making the porous particles. Such arrangements can be achieved during the manufacture of the i) porous particles using the teaching provided herein and teaching provided in references cited herein.

ii) Film-Forming Binder Materials:

One or more ii) film-forming binder materials are present in the non-foamed aqueous compositions, and each film-forming binder material is designed or chosen so that it has the following properties: it is generally water-soluble or water-dispersible; it is capable of adhering well to the woven yarns of the fabric substrate; it is capable of being dried and where desired also crosslinked (or at least partially cured); it has good light and heat stability; and it is film-forming, for example having a $T_g$ of less than 25° C., a $T_g$ of less than or equal to 0° C., or a $T_g$ of less than or equal to −10° C., or a $T_g$ of less than or equal to −25° C., all determined using Differential Scanning Calorimetry.

The ii) film-forming binder materials can include one or more organic polymers that can be provided as an emulsion, dispersion, or in an aqueous solution. They can also include polymers that are self-crosslinking, or they can include one or more polymers that are self-crosslinking or self-curable, or they can include one or more polymers to which crosslinking agents are added and are thus curable or capable of being at least partially crosslinked or cured under appropriate conditions.

Thus, if the ii) film-forming binder material is crosslinkable (or curable) in the presence of a suitable crosslinking agent or catalyst, such crosslinking (or curing) can be activated chemically with heat, radiation, or other known means. The curing or crosslinking agent is generally a chemical having functional groups capable of reacting with reactive sites in the ii) film-forming binder material (such as a functionalized latex polymer) under curing conditions to thereby produce a crosslinked structure. Representative useful crosslinking agents include but are not limited to, multifunctional aziridines, aldehydes, methylol derivatives, and epoxides.

It is essential to include one or more halogenated polymers, specifically chlorinated polymers, as part of the ii) film-forming binder materials. Such chlorinated polymers include, but are not limited to, vinyl chloride polymers (homopolymers and copolymers), vinylidene chloride polymers (homopolymers and copolymers), and vinyl chloride-acrylic copolymers.

The term "vinyl chloride polymer" means that the polymer is composed at least in part from recurring units derived from the vinyl chloride monomer or from an ethylenically unsaturated polymerizable monomer having a "precursor" group that can be converted to a chloro group. In most instances, such polymers compose only such recurring units (homopolymers), or such recurring units are the predominant (over 50 mole %) of all recurring units (in copolymers) derived from various ethylenically unsaturated polymerizable monomers other than the acrylic acid, methacrylic acid, and esters thereof described in the following paragraph.

The term "vinyl chloride-acrylic copolymer" refers to copolymers having both recurring units derived from vinyl chloride as well as recurring units derived from one or more ethylenically unsaturated polymerizable acrylic acid or acrylic acid ester monomers such as methyl acrylate, methyl methacrylate, ethyl acrylate, ethyl methacrylate, butyl acrylate, acrylic acid, methacrylic acid, and others that would be readily apparent to one skilled in the art.

Other useful halogenated polymers include vinylidene chloride polymers that are defined as comprising at least some recurring units and up to and including 100 mole % recurring units, derived from the ethylenically unsaturated polymerizable monomer that is vinylidene chloride.

Such polymers (both homopolymers and copolymers), however they are formed, thus comprise pendant chloro groups in at least some recurring units randomly occurring along the polymeric chain.

Useful halogenated polymers such as chlorinated polymers (including chlorinated homopolymers and chlorinated copolymers) can be obtained from various commercial sources or prepared using known starting materials and polymer synthetic methods, and can be provided for example in latex form.

In addition, mixtures of one or more chlorinated polymers can be used as the ii) film-forming binder material. In addition, the "mixture" of polymers can also include film-forming vinyl polymers such as acrylic polymers that contain no pendant chloro groups. For example, a useful mixture of ii) film-forming binder materials includes but is not limited to, a mixture of poly(vinyl chloride) and a non-halogenated acrylic polymer, in suitable weight ratios; a vinyl chloride-acrylic polymer and a non-halogenated acrylic polymer, in suitable weight ratios; or a vinylidene chloride polymer and a non-halogenated acrylic polymer, in suitable weight ratios.

Other suitable non-halogenated film-forming binder polymers that can be used in such mixtures of polymeric materials include but are not limited, to water-soluble or water-dispersible polymers of the following types: poly(vinyl alcohol), poly(vinyl pyrrolidone), ethylene oxide polymers, polyurethanes, urethane-acrylic copolymers, other acrylic polymers, styrene-acrylic copolymers, vinyl polymers, vinyl acrylic copolymers, styrene-butadiene copolymers, acrylonitrile copolymers, and polyesters, silicone polymers or a combination of two or more of these organic polymers. Such film-forming binder materials are readily available from various commercial sources or can be prepared using known starting materials and polymer synthetic conditions. A useful class of non-halogenated film-forming binder materials includes aqueous latex polymer dispersions such as acrylic latexes that can be ionic or nonionic colloidal dispersions of acrylate polymers and copolymers. Useful film-forming aqueous latexes also include styrene-butadiene latexes, poly(vinyl pyridine) latexes, poly(acrylonitrile) latexes, and latexes formed from acrylonitrile, butyl acrylate, and ethyl acrylate.

With some routine experimentation, a skilled worker would be able to determine the optimal type and mixture of film-forming polymeric materials to design the best ii) film-forming binder material to use in the non-foamed aqueous composition and the resulting non-foamed dry light-attenuating coatings according to the present invention.

The ii) film-forming binder material (including mixtures thereof) can be present in the non-foamed aqueous composition in an amount of at least 4 weight % or at least 8 weight %, and up to and including 16 weight % or up to and including 20 weight %, all based on the total weight of the non-foamed aqueous composition. Of these amounts, the chlorinated polymers such as one or more vinyl chloride polymers, vinyl chloride-acrylic polymers, or vinylidene chloride polymers generally comprise at least 5 weight % and up to 100 weight %, based on the total weight of ii) film-forming binder material in the non-foamed aqueous composition, and resulting non-foamed dry light-attenuating coating.

All of the polymer components of the ii) film-forming binder materials useful in the present invention can be obtained from various commercial sources or prepared using known synthetic procedures and starting materials available to a skilled polymer chemist.

iii) White Inorganic Particulate Filler Materials:

Useful iii) white inorganic particulate filler materials in the non-foamed aqueous composition according to this invention are desirably those that have a refractive index (RI) greater than 2. RI is defined above. The high contrast between a material having such a high refractive index such as titanium dioxide, and other components in the non-foamed aqueous composition make this filler material especially effective for increasing opacity and lightness of coloration.

These iii) white inorganic particulate filler materials also have a median (or $d_{50}$) particle size of less than 1 μm, as measured at room temperature using known methods and equipment. In many instances, the medium particle size is available from the vendor of the materials.

Examples of useful iii) white inorganic particulate filler materials having such RI include but are not limited to, titanium dioxide (anatase or rutile), aluminum oxide, barium sulfate, zinc oxide, and zinc sulfide. Combinations (mixtures) of different white inorganic particulate filler materials can be used if desired, such as a mixture of a form of titanium dioxide and aluminum oxide, in suitable weight ratios.

The desired inorganic particulate filler materials are generally "white" meaning that they contribute light-scattering properties to coatings. These filler materials act by scattering and reflecting all wavelengths of visible light, owing to their relatively high refractive index, so that they are perceived as white by the human eye.

The amount of iii) white inorganic particulate filler material(s) in the non-foamed aqueous composition can be at least 2 weight % or at least 5 weight %, and up to and including 10 weight % or up to and including 15 weight %, all based on the total weight of the non-foamed aqueous composition.

Such useful iii) white inorganic particulate filler materials, including titanium dioxide, can be obtained from various commercial sources. The iii) white inorganic particulate filler materials are different materials from all of the i), ii), and iv) components defined herein.

iv) White Low-Density Particulate Hydrated Alumina

This essential component is also known as aluminum hydroxide [$Al(OH)_3$] or alumina hydroxide, and it is different from the iii) white inorganic particulate filler materials described above. Such iv) white low-density particulate hydrated alumina generally has a median ($d_{50}$) particle size of less than or equal to 3 µm, or more likely of at least 1 µm and up to and including 3 µm, as measured using methods and commercially available particle size analyzers well known in the industry.

By "low-density", it is meant that the useful materials have a density less than 4 preferably less than 3.

The iv) white low-density particulate hydrated alumina is generally present in the non-foamed aqueous compositions in an amount of at least 2 weight % or at least 5 weight %, and up to and including 12 weight % or up to and including 16 weight %, all based on the total weight of the non-foamed aqueous composition.

These iv) white low-density particulate hydrated alumina can be obtained from various commercial sources or prepared from known starting materials and synthetic procedures. They are different from all of the i), ii), and iii) components described above.

Optional Materials

While the i) porous particles, ii) film-forming binder materials, iii) white inorganic particulate filler materials, and iv) white low-density particulate hydrated alumina described above are the only essential materials used in the non-foamed aqueous composition according to the present invention to provide the inventive properties described above, some optional materials may be included as long as they do not materially interfere with those inventive properties, but may enhance some properties such as coloration or coating properties. Such optional materials can be present in a total amount of less than 2 weight %, based on the total weight of the non-foamed aqueous composition. Such optional materials can include but are not limited to, thickening agents, flame retardants, anti-foaming agents, defoaming agents, UV radiation stabilizers, heat stabilizers, optical brighteners, tinting agents, dispersants, biocides, lubricants, and moisture or deflection control agents, individually or in any combination. Some of these materials are defined in more detail below.

These optional materials can be incorporated into the non-foamed aqueous composition in any manner that is technically practical, such as incorporating them within the i) porous particles (either within discrete pores, the continuous polymeric phase, or in both the discrete pores and continuous polymeric phase); within the ii) film-forming binder materials; or within both i) porous particles and ii) film-forming binder materials. Various optional materials can be in different locations in the coating. The resulting non-foamed light-attenuating coating can comprise any or all of these optional materials.

v) Defoaming Agents and Anti-Foaming Agents

It can be particularly useful to include one or more v) defoaming agents or anti-foaming agents (or anti-foamants), or both defoaming agents and anti-foaming agents, in a total amount of at least 0.01 weight % and up to and including 1 weight %, based on the total weight of the non-foamed aqueous compositions. If present, these v) defoaming agents and anti-foaming agents are different from all of the i), ii), iii), iv) components described above, and the vi) flame retardants described below.

For most fluid systems including the non-foamed aqueous compositions of the present invention, foam control is a challenge to overcome. Pure liquids do not foam. Aqueous solutions or dispersions containing additives such as surfactants and filler materials and other particles are prone to foam formation in water. In the practice of the present invention, the presence of foam or entrained air is generally undesirable and can significantly impact the outcome (for example, appearance and performance of the resulting coated fabric substrate). To prevent foam and the problems it generates, and to keep the process running smoothly, many embodiments of the non-foamed aqueous compositions of this invention include one or more defoaming agents.

The chemistry of defoaming agents and anti-foaming agents is often similar, their main difference being timing of application. Defoaming agents can be used to control any existing foam in an aqueous composition while anti-foaming agents can be used to prevent the formation of foam in an aqueous composition.

Typically, anti-foaming agents and defoaming agents are inert (or non-reactive) chemicals. They are typically comprised of a liquid or hydrophobic solid. An effective anti-foaming agent must be insoluble in the medium it is used in or it will not perform the desired function. However, an anti-foaming agent must not be so incompatible in the aqueous composition so as to cause deposition problems. Such materials are different from all of the i) porous particles, ii) film-forming binder materials, iii) white inorganic particulate filler materials, and iv) white low-density particulate hydrated alumina, and different from the vi) flame retardants described below. Such materials are intended in the present invention to either break down a foam or to prevent the formation of foam in the non-foamed aqueous composition. Even modest mixing of chemical components can tend to form some foam, for example so the presence of a defoaming agent can serve to minimize foam formation, so that the eventual non-foamed aqueous composition can be applied to a fabric substrate while having a density of greater than 0.8 g/cm$^3$, or even greater than 0.9 g/cm$^3$.

Useful v) defoaming agents and anti-foaming agents include but are not limited to, liquids such as mineral oil, silicone, and/or hydrophobic polyol, and a hydrophobic solid, such as hydrophobic silica, ethylene-bis-stearamide, fatty acid, and/or fatty alcohol. For example, a useful defoaming agent is available as BYK® 022 from BYK Gardner. Other defoaming agents and anti-foaming agents can be obtained from various commercial sources as would be readily apparent to one skilled in the art.

It is can also be desirable to include a flame retardant, or a mixture of two or more of these materials, to reduce the flammability of the coated fabric substrates. Chlorinated polymers such as poly(vinyl chloride) and poly(vinylidene chloride) are inherently self-extinguishing, flame retardant materials due to the presence of chlorine in the compositions. Poly(vinyl chloride) can also be used to coat the core yarns used to make fabric substrates. Additionally, some fiberglass-containing yarns are inherently flame retardant.

The ii) film-forming binder materials, and the iv) white low-density particulate hydrated alumina, both described above, can also act as flame retardants in the practice of this invention. Hydrated alumina is known to be a flame retardant and a smoke suppressing filler. It can also act synergistically with antimony trioxide, zinc borate, or phosphorus-containing flame retardants for increased flame retardancy.

Beyond the materials described above, useful flame retardants include but are not limited to, oxygenated antimony compounds (such as antimony trioxide), hydrated metal oxides (such as hydrated alumina, magnesium, tin, zinc, and lead oxides, including alumina trihydrate); phosphorus- or nitrogen-containing flame retardants (such as ammonium polyphosphates); melamine isocyanurate; derivatives or pentaerythritol and a melamine; ammonium molybdates; hydrated or non-hydrated zinc borates; and mixtures of two or more of these compounds. Specific examples of useful compounds are described in [0036]-[40043] of U.S. Patent Application Publication 2013/0052900 (Jung et al.) and in U.S. Pat. No. 6,032,454 (Damour et al.), the disclosures of both of which are incorporated herein by reference. Useful flame retardants can be obtained from various commercial sources, and if present, they are different from all of the i), ii), iii), iv), and v) components described above.

Other optional components for the non-foamed aqueous compositions include thickening agents that can be used to modify the viscosity of the non-foamed aqueous composition before it is used according to the present invention. Particularly useful rheology modifiers are RHEOLATE® HX 6010 (Elementis), OPTIFLO®-T 1000 (BYK), RHEO-VIS® PU 1214 (BASF), ACRYSOL® G111 (Dow Chemical Company), and Paragum (Royal Adhesives, Inc.). Other useful thickeners include but are not limited to, xanthan gum, alginin, guar gum, locust bean gum, acrylic polymers that are alkali swellable, agar, carboxymethyl cellulose, pectin, and carrageenan. Such thickeners can be present in the non-foamed aqueous composition in an amount of up to and including 2 weight %, based on the total weight of the non-foamed aqueous composition. Useful thickeners can be obtained from various commercial sources.

In addition, biocides (that is, antimicrobial agents or antifungal agents) can be present in the non-foamed aqueous compositions to reduce or prevent growth of microorganisms and fungi in the coated fabric substrates. Examples of such materials are well known in the art and are commercially available from various sources.

Tinting agents can be present to provide a specific observable color, coloration, or hue in the resulting coated fabric or textile, as long as the coloration is "light" in nature, that is having a low chroma value and visually appears to emit or reflect more light, and having an L* of at least 60. Mixtures of tinting colorants can be present, and they can be different in composition and amounts. The desired coloration or hue can be obtained using specific tinting colorants and can be used in combination with specific amounts of i) porous particles to offset or modify the original color to provide more whiteness (or brightness) in the final "color" (or coloration). The one or more tinting colorants can be incorporated within the i) porous particles (either within the volume of discrete pores, within the continuous polymeric phase, or in both places), or they can be uniformly dispersed within the ii) film-forming binder material. Alternatively, one or more tinting colorants can be present within both the i) porous particles (in a suitable location) and within the ii) film-forming binder material. Tinting colorants can be dyes or organic pigments that are soluble or dispersible in organic solvents and polymers that are used for making the i) porous particles and thus can be included within the oil phase used to prepare such i) porous particles.

It can also be useful to include one or more optical brighteners to increase the whiteness (brightness, L*, or "fluorescent" effect) of the final coloration in the non-foamed light-attenuating coating. Optical brighteners are sometimes known in the art as "fluorescent whiteners" or "fluorescent brighteners." In general, such materials are organic compounds selected from classes of known compounds such as derivatives of stilbene and 4,4'-diaminostilbene (such as bistriazinyl derivative); derivatives of benzene and biphenyl (such as styril derivatives); pyrazolines; derivatives of bis(benzoxazole-2-yl); coumarins; carbostyrils; naphthalimides; s-triazines; and pyridotriazoles. Specific examples of optical brighteners can be found in various publications including "Fluorescent Whitening Agents," Kirk-Othmer Encyclopedia of Chemical Technology, Fourth Edition, volume 11, Wiley & Sons, 1994.

Dispersants and surfactants can be present in the non-foamed aqueous compositions to provide colloidal stability and prevent agglomeration of the particulate materials thereby ensuring storage stability (no viscosity instability, no separation) in the formulations, and as coating aids to provide good static control and dynamic surface tension reduction. Examples of useful dispersants include but are not limited to, COATOSIL® 77 nonionic organo-modified trisiloxane, DYNOL™ 604 acetylenic diol-based wetting agent, MAXXSPERSE® 3000 sodium polyacrylate, and water-soluble SOLSPERSE® 43000 polymeric dispersants.

The non-foamed aqueous compositions according to the present invention can be prepared by mixing the essential and optional components described above in a suitable aqueous medium (that is predominantly water) using suitable mixers such as an overhead stirrer attached with a Cowles blade, impeller or turbine blade in order to break up any agglomerated particles and to create a stable suspension (or dispersion) of fine solids. Mixing should be carried out in a manner such that foaming or bubble formation is minimized, and the presence of the v) defoaming agents noted above can aid in this result also.

After application and drying to form a coated fabric substrate as described below according to the present invention, the resulting non-foamed light-attenuating coating generally has very little aqueous medium (such as water) left. That is, the residual amount of aqueous medium can be as little as 5 weight % or less, or even 1 weight % or less, based on the total weight of the formed non-foamed light-attenuating coating.

Fabric Substrates

Fabric substrates that can be used in the practice of the present invention are generally prepared by appropriate fashioning or weaving of continuous yarns using known procedures into textiles (or textile structures) or fabric substrates of any desired width and length. Use of the non-foamed aqueous compositions according to this invention is not limited to specific yarns or fabric substrates. However, the present invention is particularly useful to provide coated fabric substrates that are woven from coated yarns comprising one or more fiberglass fibers in the cores, and more particularly, from composite yarns having multiple fiberglass fibers such as multifilament fiberglass-containing yarns that are clad (or coated) with specific coatings that are known in the art, as described below.

Useful yarns for making fabric substrates can be prepared using suitable extrusion techniques known in the art. For example, a composite yarn can be prepared to have a core of a continuous yarn fiber and a coated sheath disposed coaxially around that core, for example using a resin matrix comprising at least one chlorinated polymer material, as described for example in U.S. Pat. No. 6,032,454 (noted above), the disclosure of which is incorporated herein by reference. For example, a composite yarn can be prepared by passing the yarn core (such as a mono- or multifilament fiberglass core) through a bath comprising an aqueous composition and then through a heat treatment that serves to remove the water and any other solvents, and to cure or set any curable materials in the aqueous composition.

Composite yarns typically comprise a continuous length of yarns forming a yarn core as described above. Particularly useful yarn cores comprise a set of one (mono-) or more (multi-) individual continuous filaments composed of synthetic or naturally-occurring materials, such as fiberglass, extending essentially in the same direction longitudinally. Multifilament yarn cores comprising two or more individual continuous filaments are useful in many embodiments.

Each composite yarn generally has a mean diameter of at least 25 μm and up to and including 1500 μm or of at least 100 μm and up to and including 1000 μm. The "mean diameter" is the arithmetic mean of multiple diameter measurements taken of the composite yarn, for example ten such measurements, using an MSD 25 diameter measuring device (for example, available from Zumbach). A mono- or multifilament yarn core can have a denier of at least 75 and up to and including 2500 wherein a denier refers to a 1.2 g per 9000 meters of a continuous strand.

It is desirable that such continuous filaments be composed of one or more materials that burn poorly and have a melting point greater than the temperature at which polymers coated axially thereon are processed or dried. In some embodiments, each continuous filament can be composed of organic or inorganic materials lacking halogen atoms and are recyclable. The continuous filaments can be of uniform or variable length. Such materials can include but are not limited to, thermoplastic polymers such as polyamides (such as nylon); aramids (aromatic polyamides such as Nomex); polyesters [such as polyethylene terephthalate (PET)]; polyurethanes; polyolefins (such as polypropylenes, polyethylenes, and ethylene-propylene copolymers); vinyl polymers (such as vinyl acetate and acrylic resins); cellulosic polymers (such as cellulose acetate); cotton; and glasses (in the form of fiberglass). Fiberglass filaments are particularly useful to form a mono- or multifilament core.

The yarn core according to the present invention can comprise at least on an average 15 weight % and up to and including 50 weight %, based on the total dry weight of the composite yarn. The mean diameter of the yarn core is generally at least 20 μm and up to and including 1450 μm or of at least 90 μm and up to and including 950 μm. The "mean diameter" is the arithmetic mean of multiple diameter measurements taken of the yarn core, for example ten such measurements, using an MSD 25 diameter measuring device (for example, available from Zumbach). The various continuous filaments can be designed with a particular composition, mean diameter, and length to provide a desired tensile strength.

Some or all continuous filaments in the mono- or multifilament yarn core can comprise one or more additives including but not limited to filament (or fiber) reinforcing materials, polymer stabilizers, UV absorbers, flame retardants, plasticizers, tinting colorants, opacifying colorants, or other materials that one skilled in the art would readily understand as useful in such materials, for example as described in EP 0 900 294B1 (noted above).

Each mono- or multifilament yarn core can be prepared using known technology, for example as described in U.S. Patent Application Publication 2007/0015426 (Ahmed et al.), the disclosure of which is incorporated herein by reference.

The yarn can be coated as described above using the teaching in U.S. Pat. No. 6,032,454 (noted above).

Other aqueous compositions used to make composite yarns are described in U.S. Patent Application Publications 2020-0172744 (Brick et al.), 2020-0173099 (Nair et al.), and 2020-0173067 (Sedita et al.), the disclosures of all of which are incorporated herein by reference. Such fabric substrates are prepared using composite yarns that can comprise a fiberglass core and a coating applied in a coaxial manner, which coating comprises porous particles like the i) porous particles described above along with other components. However, the porous particles present in such coaxial coating do not purposely contain the opacifying colorants described above for the i) porous particles required for the present invention.

All of the composite yarns useful for the present invention can be prepared using a method that includes withdrawing the yarn core from a supply bobbin; passing it through a receptacle wherein it is immersed in a suitable non-foamed aqueous composition; passing it through a die that serves to remove excess aqueous composition; drying it in an oven maintained at a suitable temperature including curing of the resin materials; and then winding up the resulting composite yarn is wound onto a take up reel.

Fabric substrates useful in the present invention can be prepared by appropriate weaving or other manufacturing process using a plurality of composite (or non-composite) yarns. For example, a yarn can be subjected to warping, weaving, tentering, and packaging operations to obtain a formed fabric substrate of any size or shape. Alternatively, the yarn can be woven, interlocked, spun, knitted, or adhesively-bonded using techniques known in the art. The yarn strands useful in this manner can vary in dry thickness and length as long as they are suitable for the fabric substrate and its intended purpose. In most embodiments, the fabric substrate thickness is at least 50 μm. The yarn should have suitable hardness, tensile strength, lot moisture content (for example, less than 1 weight % at 70% relative humidity), elongation, and light fastness. Details about such processes are provided in [0072] through [0076] of U.S. Patent Application Publication 2013/0052900 (Jung et al.), which disclosure of which is incorporated herein by reference.

The fabric substrates useful in the present invention generally have an openness (or Openness Factor) of 0% and up to and including 15%, or of at least 1% and up to and including 10%, or more likely of at least 3% and up to and including 10%.

Prior to forming the coated fabric substrates according to the present invention, the fabric substrates described above can be used "as is" or they can be subjected to further operations to incorporate them into various articles and devices before application of the non-foamed aqueous composition. For example, a fabric substrate can be laminated to films, papers, or other elements before application of a non-foamed aqueous composition.

Also before application of the non-foamed aqueous composition, it is possible to print images on one or both outer surfaces of a fabric substrate using any suitable printing means such as inkjet printing or flexographic printing, thereby forming printed images of text, pictures, symbols, or combinations thereof. Such printed images can be visible, or they can be invisible to the unaided eye (for example, using fluorescent dyes or other security images in the printed images).

A thermally printed image can be formed on one or both outer surfaces of a fabric substrate, for example, by using a thermal (sublimable) dye transfer printing process (using heat and with or without pressure) from one or more thermal donor elements comprising a dye donor layer comprising one or more dye sublimation printable colorants. For example, a thermal colorant image can be obtained using one or more thermal dye patches with or without a thermal colorless (clear) patch. Useful details of such a process to make thermally printed images are provided in U.S. Pat. No. 10,145,061 (Nair et al.), the disclosure of which is incorporated herein by reference.

Preparing Coated Fabric Substrates

The fabric substrates described above can be provided in accordance with the present invention to prepare coated fabric substrates. Each fabric substrate then comprises a plurality of coated yarns, all woven together, and at least some of the plurality of coated yarns comprises a core (for example, a bundle of fiberglass fibers). Each fabric substrate comprises a first side and an opposing second side. When a fabric substrate is used as a window treatment, the first side is typically the side that is visible to a viewer inside a room or building and, can be referred to as the room-side. The second (or street) side of the fabric substrate then would generally have incident outside light or radiation and be seen, for example, by someone outside the room or building and, can be referred to as the street side.

A non-foamed light-attenuating coating is then formed generally on the first side of a suitable fabric substrate, and by application of a non-foamed aqueous composition that is generally dried using conventional means, and optionally cured to provide a coated fabric substrate according to the present invention. Drying and optional curing can be accomplished by, for example, using hot air at 120° C. for up to two minutes or heating at a temperature greater 135° C. for up to three minutes. By the term "dry", it is meant that the non-foamed light-attenuating coating generally comprises less than 5 weight %, or even less than 1 weight %, or water or other liquids. The amounts of the various essential and optional components of the non-foamed light-attenuating coating are as follows:
  i) porous particles as described above are generally present in an amount of at least 0.5 weight % or at least 2 weight % and up to and including 20 weight % or up to and including 40 weight %, which i) porous particles can optionally comprise an opacifying colorant, as described above, in an amount of at least 0.01 weight % or at least 0.1 weight %, and up to and including 0.3 weight % or up to and including 1 weight %, based on the total weight of the i) porous particles;
  ii) a film-forming binder material comprising at least a chlorinated polymer (as described above), which ii) film-forming binder material, as described above, and being present in an amount of at least 15 weight % or at least 20 weight % and up to and including 35 weight % or up to and including 50 weight %;
  iii) a white inorganic particulate filler material having a refractive index (RI) greater than 2 and a median particle size of less than 1 µm, the iii) inorganic particulate filler material being present in an amount of at least 8 weight % or at least 15 weight %, and up to and including 30 weight % or up to an including 40 weight %; and
  iv) a white low-density particulate hydrated alumina having a median particle size of less than or equal to 3 µm, as described above, and being present in an amount of at least 10 weight % or at least 20 weight %, and up to and including 30 weight % or up to and including 50 weight %,
  all amounts of the i), ii), iii), and iv) components being based on the total weight of the non-foamed light-attenuating dry coating.

The non-foamed aqueous composition can be applied as a conformal coating to the first side of a fabric substrate using a suitable application means, such as spray coating, such that the openness facture (OF) is only minimally reduced (that is, reduction of less than 20% of the original openness factor), and the resulting coating covers only the top surface of the fibers and optionally the sides of the fibers without flowing significantly to the second side of the fabric substrate. It is beneficial to place an adsorbent pad directly behind and in intimate contact with the second side to achieve these results.

The parameters of a spray system used for such application, such as the size of the nozzle tip, coating speed, duty cycle, and distance between sample and the spray nozzle, can be optimized by a skilled worker for controlling coating weight, coating thickness, coating uniformity, and coating reproducibility. Examples of spray coating for various fabric substrates ranging from small squares to roll-to-roll high speed continuous and scalable fabrication include airbrushing and atomized spray techniques.

There are also several methods for spraying aqueous compositions onto surfaces that are known in the art and they can be used in the practice of this invention. These include but are not limited to, compressed air spraying that converts the drops of the non-foamed aqueous composition into a mist; electrostatic spray systems where application of an electric field at the nozzle controls the drop size and the electric field between the drop of non-foamed aqueous composition and the surface controls its deposition; ultrasonic spray systems where the ultrasonic energy can be used to create a mist of uniform drop size of the non-foamed aqueous composition; and rotary spraying that uses centrifugal force to atomize the non-foamed aqueous composition. The most common spray technology uses fluid pressure and nozzle design to create non-foamed aqueous composition drops of a desired size. In addition to controlling drop size, nozzle designs also include the geometry of an ensemble of drops exiting the nozzle. Such geometries include for example, a cone, a fan (trapezoidal), or a jet. The choice of the geometry is selected based on the application method and depends upon the orientation between the spray nozzle and the substrate and whether the spray system is mobile and the surface is stationary or vice versa or a combination of the two.

A desirable method of applying the non-foamed aqueous composition according to the present invention is to use a stationary spray system with a moving surface. In this process, the desired geometry of the ensemble of non-foamed aqueous composition drops exiting a nozzle is a that of a fan with the first side of a fabric substrate moving perpendicularly to the plane of the fan. When the first side surface width is larger than the width of the fan, multiple nozzles can be employed and spaced apart such that the overlapping sprays from adjacent nozzles creates a uniform coverage of drops across the width of the first side of the fabric substrate. In addition to using hydraulic pressure to disperse the drops, other mechanical forces such as nozzle pulsation, ultrasound, centrifugal force, or air currents, or a combination of two or three of these means, can be used to aid uniform distribution of the non-foamed aqueous composition onto the first side of the fabric substrate. Another aspect of controlling the uniformity of depositing the non-foamed aqueous composition is to control its properties, specifically its viscosity and surface tension, which are properties well known to those of ordinary skill in the art. For example, for achieving desirable small drops, the viscosity and surface tension at the shear rates experienced at the nozzle should be low. Hence shear thinning fluids are preferred such that the viscosity at the nozzle shear rates is low, lower than 10 mPa-sec, but the zero-shear viscosity is high, higher than 100 mPa-sec measured at 25° C. using procedures and equipment described above. In such embodiments, the non-foamed aqueous composition comprises a suitable coating aid (for example, a wetting surfactant), such as any low molecular weight surfactant, which can lower the dynamic surface tension of the non-foamed aqueous composition and thus provide the lowest surface tension. Useful surfactants for this purpose are described above.

A uniformly distributed coating of the non-foamed aqueous composition can thus be formed over (or directly onto) only the first side of the fabric substrate, by any spraying technique described above.

The applied non-foamed aqueous composition can be dried by simple evaporation of water and any other solvents, to form the dry non-foamed light-attenuating coating on the first side of the fabric substrate. This drying can be accelerated by known techniques such as convection heating including forced air or infrared heating, or other means that would be apparent to one skilled in the art. The drying can also be carried out or continued in the optional curing operation described as follows.

Curing the applied or formed non-foamed aqueous composition can be carried out under suitable conditions known to one skilled in the art For example, curing (and drying) can be accomplished using heat or infrared radiation or other conditions which are responsive to achieve crosslinking of the ii) film forming binder materials The resulting coated fabric substrates can be cut to desired sizes, "finished" in any suitable manner, and images or text can be printed thereon as described above for the fabric substrates.

The present invention provides at least the following embodiments and combinations thereof, but other combinations of features are considered to be within the present invention as a skilled artisan would appreciate from the teaching of this disclosure:

1. A method of making a coated fabric substrate, comprising:
    A) providing a fabric substrate comprising a plurality of core yarns, all woven together, wherein at least some of the plurality of core yarns comprise fiberglass, which fabric substrate has a first side and a second side; and
    B) forming a non-foamed light-attenuating coating on at least the first side of the fabric substrate from a non-foamed aqueous composition having a density of greater than 0.8 g/cm³, to provide the coated fabric substrate, which non-foamed light-attenuating coating, and comprises components i) through iv):
    i) porous particles present in an amount of at least 5 weight % and up to and including 40 weight %, each porous particle comprising a continuous polymeric phase and discrete pores dispersed within the continuous polymeric phase, having a mode particle size of at least 2 μm and up to and including 50 μm, and optionally comprising an opacifying colorant in an amount of up to and including 1 weight %, the amount of the opacifying colorant being based on the total weight of the i) porous particles;
    ii) a film-forming binder material comprising at least a chlorinated polymer, which ii) film-forming binder material is present in an amount of at least 15 weight % and up to and including 50 weight %;
    iii) a white inorganic particulate filler material having a refractive index (RI) greater than 2 and a median particle size of less than 1 μm, the iii) inorganic particulate filler material being present in an amount of at least 8 weight % and up to and including 40 weight %; and
    iv) a white low-density particulate hydrated alumina having a median particle size of less than or equal to 3 μm, and being present in an amount of at least 10 weight % and up to and including 50 weight %,
    all amounts of the i), ii), iii), and iv) components being based on the total weight of the non-foamed light-attenuating coating.

2. The method of embodiment 1, wherein the non-foamed light-attenuating coating further comprises:
    v) a defoaming agent or an anti-foaming agent, or both, each of which is different from all of the i), ii), iii), and iv) components.

3. The method of embodiment 1 or 2, wherein the non-foamed light-attenuating coating further comprises:
    a flame retardant that is different from all of the i), ii), iii), iv), and v) components.

4. The method of any of embodiments 1 to 3, wherein the i) porous particles are present in the non-foamed light-attenuating coating in an amount of at least 2 weight % and up to and including 20 weight %, based on the total weight of the non-foamed light attenuating coating, and each porous particle having a mode particle size of at least 3 μm and up to and including 20 μm.

5. The method of any of embodiments 1 to 4, wherein the i) porous particles comprise the opacifying colorant.

6. The method of any of embodiments 1 to 5, wherein the i) porous particles comprise the opacifying colorant in an amount of at least 0.01 weight % and up to and including 1 weight %, the amount being based of the total weight of the i) porous particles.

7. The method of any of embodiments 1 to 6, wherein the opacifying colorant is a carbon black and is present in the discrete pores of the i) porous particles.

8. The method of any of embodiments 1 to 7, wherein the ii) film-forming binder material is present in an amount of at least 20 weight % and up to and including 40 weight %, based on the total weight of the non-foamed light-attenuating coating.

9. The method of any of embodiments 1, wherein the chlorinated polymer comprises at least 5 weight % and up to and including 100 weight %, based on the total weight of the ii) film-forming binder material.

10. The method of any of embodiments 1 to 9, wherein the chlorinated polymer is selected from poly(vinyl chloride), a vinyl chloride-acrylic copolymer, poly(vinylidene chloride), and a combination of two or more of these polymeric materials.

11. The method of any of embodiments 1 to 10, wherein the iii) white inorganic particulate filler material is present in an amount of at least 15 weight % and up to and including 30 weight %, based on the total weight of the non-foamed light-attenuating coating.

12. The method of any of embodiments 1 to 11, wherein the iii) white inorganic particular filler material is selected from anatase titanium dioxide, rutile titanium dioxide, aluminum oxide, barium sulfate, zinc oxide, zinc sulfide, and a combination of two or more of these materials.

13. The method of any of embodiments 1 to 12, wherein the iv) white low-density particulate hydrated alumina is present in an amount of at least 20 weight % and up to and including 30 weight %, based on the total weight of the non-foamed light-attenuating coating.

14. The method of any of embodiments 1 to 13, comprising forming a non-foamed light-attenuating coating on only the first side of the fabric substrate.

15. A coated fabric substrate comprising a plurality of core yarns, all woven together, wherein at least some of the plurality of core yarns comprise fiberglass,
which fabric substrate has a first side and a second side, and a non-foamed light attenuating coating disposed on the first side of the fabric substrate only, which non-foamed light attenuating coating, which coated fabric substrate is obtained from any of the method embodiments 1 to 14.

16. The coated fabric substrate of embodiment 15, comprising the non-foamed light-attenuating coating on only the first side of the fabric substrate.

The following working Examples are provided to illustrate the practice of this invention and are not meant to be limiting in any manner. Each noted example was actually carried out. The following materials were used in the Examples.

Materials Used in the Following Examples:

The porous particles (P) used in the Invention Examples comprised cellulose acetate butyrate as the continuous polymeric phase, with and without any opacifying pigment, and were prepared as described in U.S. Pat. No. 9,963,569 (noted above). The resulting porous particles had a nominal mode particle size of 5-6 µm and a porosity of approximately 46% and was at 50% solids. The i) porous particles were prepared such that a 0.05 weight % of carbon black was incorporated in the particles as the opacifying colorant, based on the total weight of the i) porous particles.

VYCAR® 460×46 a PVC-acrylic copolymer emulsion at 49.6% solids, used as the ii) film-forming binder polymer, was obtained from Lubrizol Corp.

Spacerite® S-3 alumina trihydrate was obtained from J. M. Huber Corporation was used as a dispersion in water at 59% solids.

Ti-Pure® R900 titanium dioxide was used as the iii) white inorganic particulate filler material, and was obtained from DuPont.

Maxxsperse® 3000 sodium polyacrylate dispersant was obtained from MCTRON Technologies.

COATOSIL™ 77 is nonionic organo-modified trisiloxane surfactant (coating aid) that was obtained from Momentive Performance Materials.

Dynol™ 604 acetylenic diol surfactant was obtained from Evonik
Industries.

BYK®-022 is a silicone-containing v) defoaming agent was obtained from BYK Gardner.

The carbon black was obtained as Black Pearls 880 from Cabot Corporation and converted to an aqueous dispersion using SOLSPERSE® 43000, a polyacrylate polymeric dispersant, obtained from Lubrizol Corporation. This dispersion was used to prepare the i) porous particles (P).

Kelzan® Xanthan gum thickener was obtained from CP Kelco.

The fabric substrate was E Screen™, a PVC coated woven fiberglass fabric from Mermet USA. It had an openness factor of 5%.

Measurements:

The total visible reflectance (TVR) of each coated fabric substrate sample was measured in the 400-700 nm wavelength range using a Hunter Labs UltraScan XE colorimeter equipped with an integrating sphere, a pulsed Xenon light source, and a solid-state diode array detector. A light trap and a standard white tile were used to fix the reflectance range from 0 to 100%. The X, Y, and Z tristimulus values and x, y, and z chromaticity coordinates of each sample were also determined and used in conjunction with the CIELab color space (standard D65 illuminant, 10 degree observer) to calculate specific values for the lightness (L*), red-green character (a*), and yellow-blue character (b*). The Y tristimulus value and x and y chromaticity coordinate values were also used to calculate the Whiteness Index (WI) of each sample using the equation specified in ASTM E313-10:

Whiteness Index (D65/10 degree observer)=Y+800*(0.3138−x)+1700*(0.3310−y).

The total visible light transmission (TVT) of each coated fabric substrate sample was measured in the 400-700 nm wavelength range using a Perkin-Elmer Lambda 800 UV-Vis spectrophotometer. Each coated fabric substrate sample was placed at the transmission port of a 150 mm diameter integrating sphere and a reference Spectralon disk was placed at the reflection port (located opposite the transmission port). The light entering the sphere through the coated fabric substrate sample (both scattered and non-scattered) was then quantified using a photodetector located inside the integrating sphere. The diffuse (or scattered) component of the transmitted light (Diffuse visible transmission or DVT) was measured directly by replacing the Spectralon disk with a light trap to collect or "trap" all of the non-scattered light traveling through the sphere.

The zero shear viscosity of the samples were measured from rheology measurements made using the Anton Paar MCR 501 at 25° C. with a frequency sweep first followed by 2 consecutive steady shear measurements from 1 to 10,000 l/s.

Invention Example 1

A non-foamed aqueous composition according to the present invention was prepared by combining in water: Vycar® 460×46 film-forming binder polymer, porous particles (P), Spacerite® S-3 alumina trihydrate, and Ti-Pure R900® titanium dioxide in the amounts shown below in TABLE I, in a container along with MAXXSPERSE® 3000 dispersant, COATOSIL® 77 surfactant, Dynol™ 604 wetting agent, and BYK®-022 antifoaming agent. These materials were mixed using a Cowles blade until all solid particles were well dispersed, and then the dispersion was thickened by adding an aliquot of 1 weight % of an aqueous solution of Kelzan® Xanthan Gum thickener until the desired viscosity was obtained. The resulting non-foamed aqueous composition according to the present invention had approximately 25% solids, a zero shear viscosity of 700 mPa-sec (measured as noted above), and a density of 1.1 g/cm³.

This non-foamed aqueous composition was sprayed onto a fabric substrate sample (described above) using a Paasche VL airbrush (Paasche Airbrush Company, Kenosha, WI, USA) fitted with a VLT-5 (1.06 mm) airbrush tip and VLN-5 (1.06 mm) needle at 30 psi (106.8 kPa) and at a distance of 4-5 inches (or 10.2-12.7 cm) from the first side of the fabric substrate. A fine mist of atomized composition was created by the Venturi effect through the stream of the compressed air, which started to flow by pressing the trigger. The sprayed non-foamed aqueous composition was dried at 120° C. to form a dry non-foamed light-attenuating coating on the first side of the fabric substrate at a coverage of approximately 1 oz/yd$^2$ (or 23.7 g/m$^2$), thereby forming a coated fabric substrate according to the present invention. The sample size of fabric substrate used for each experiment was varied from 3 inches×4 inches (7.62 cm×10.2 cm) to 12 inches×12 inches (30.48 cm×30.48 cm). The sprayed and dried non-foamed light-attenuating coating was visually analyzed to make sure the coated fabric substrate samples evaluated for performance did not have any holes plugged. The compositions of the non-foamed light-attenuating coatings and their characteristics are shown in the following TABLES I and II.

The dry non-foamed light-attenuating coating for this inventive example contained either 0.01 weight % or 0.005 weight % of the carbon black as opacifying colorant, the amount being based on the total weight of the i) porous particles in the dry non-foamed light-attenuating coating.

Invention Example 2

The coated fabric substrate of Invention example 2 was prepared the same way as the coated fabric substrate of Invention Example 1 except that only 10 weight % of porous particles (P) were present in the dry non-foamed light attenuating coating as shown below in TABLE I. This dry non-foamed light-attenuating coating contained 0.005 weight % of carbon black as opacifying colorant, its amount being based on the amount of the i) porous particles in this dry non-foamed light-attenuating coating. The density and zero-shear viscosity values were similar to those of the non-foamed aqueous compositions prepared in Inventive Example 1.

Comparative Example 1

This reference article was merely a sample of the commercial fabric substrate known as the Mermet USA E Screen™, as identified above, on which no non-foamed light-attenuating coating was formed.

Comparative Example 2

A non-foamed aqueous composition outside of the scope of the present invention was prepared in the same manner as that described in Invention Example 1 but no i) porous particles (P) were included in the non-foamed aqueous composition. Instead, Spacerite® S-3 alumina trihydrate was used to replace the porous particles, weight for weight. All of the other components of the non-foamed aqueous composition were the same as described for Invention Example 1.

This comparative non-foamed aqueous composition was applied to a sample of the same fabric substrate in the same manner and dried to form a non-foamed light-attenuating coating having the same dry coverage as that described for the coated fabric substrates of Invention Examples 1 and 2. The dry components composition is shown below in TABLE I.

Comparative Example 3

Another non-foamed aqueous composition outside of the scope of the present invention was prepared in the same manner as that described for Invention Example 1 except that the dispersion of carbon black used in the preparation of the i) porous particles (P), was used in place of the i) porous particles (P) such that the non-foamed aqueous composition contained an equivalent amount of carbon black in the dried down non-foamed light-attenuating coating as provided in Inventive Example 1, and no i) porous particles. All of the other components of the non-foamed aqueous composition were the same as described in Invention Example 1. This comparative non-foamed aqueous composition was applied to a sample of the same fabric substrate in the same manner and dried to form a non-foamed light-attenuating coating having the same dry coverage as described for Invention Example 1. The dry components composition is shown below in TABLE I. This non-foamed light-attenuating coating contained 0.01 weight % of carbon black.

Comparative Example 4

A non-foamed aqueous composition outside of the scope of the present invention was prepared in the same manner as that described in Invention Example 2 except that the dispersion of carbon black used in the preparation of porous particles (P) was used in place of the i) porous particles (P) such that the non-foamed aqueous composition contained an equivalent amount of carbon black in the dry non-foamed light-attenuating coating as provided in Inventive Example 2, and no i) porous particles. All of the other components of the non-foamed aqueous composition were the same as described in Invention Example 2. This comparative non-foamed aqueous composition was applied to a sample of the same fabric substrate in the same manner and dried to form a non-foamed light-attenuating coating having the same dry coverage as that described for Invention Example 2. The dry components composition as shown below in TABLE I.

This non-foamed light-attenuating coating contained 0.005 weight % of carbon black as an opacifying colorant, based on the total weight of the dry non-foamed light-attenuating coating.

In the following TABLE I, the listed weight % amounts are in reference to the dry non-foamed light-attenuating coating on the coated fabric substrate.

TABLE 1

| Example | % i) Porous Particles | % Carbon black* | % iii) TiO$_2$ | % ii) film-forming binder material | % iv) Alumina trihydrate in dry coating | Coating weight g/m$^2$ |
| --- | --- | --- | --- | --- | --- | --- |
| Comparative Example 1 | NA | NA | NA | NA | NA | NA |
| Comparative Example 2 | 0 | 0 | 20 | 39 | 40 | 37.3 |
| Comparative Example 3 | 0 | 0.01 | 20 | 39 | 40 | 37.3 |
| Comparative Example 4 | 0 | 0.005 | 20 | 39 | 40 | 37.3 |
| Invention Example 1 | 20 | 0.01 | 20 | 39 | 20 | 37.3 |
| Invention Example 2 | 10 | 0.005 | 20 | 39 | 30 | 37.3 |

*based on the tota weight of the i) porous particles of the total weight of the dry non-foamed light-attenuating coating if no i) porous particles are present The properties (identified above) of the coated fabric substrates prepared in Invention Examples 1 and 2 and Comparative Examples 1-4 are provided in the following TABLE II.

TABLE II

| Example | TVR ** (%) | TVT ** (%) | DVT ** (%) | NVT ** (%) | WI ** |
|---|---|---|---|---|---|
| Comparative Example 1 | 75 | 19.1 | 12.2 | 6.9 | 75 |
| Comparative Example 2 | 77 | 15.0 | 8.2 | 6.8 | 79.5 |
| Comparative Example 3 | 64 | 11.6 | 4.6 | 7.0 | 60.9 |
| Comparative Example 4 | 70 | 13.0 | 6.3 | 6.7 | 67.1 |
| Invention Example 1 | 69 | 10.5 | 4.4 | 6.1 | 74 |
| Invention Example 2 | 73 | 12 | 6.0 | 6.0 | 74.7 |

** all defined above in the Definitions section

It can be seen from the data in TABLE II that for the Invention Example 1, the % DVT was reduced by almost 65% compared to that for Comparative Example 1 (the uncoated commercial white/white E Screen™), thereby lowering the glare in a room significantly when the inventive fabric substrate is used as a window treatment. The total light coming into the room, TVT, was also lowered without noticeably compromising the NVT (or by association, the OF). The WI on the other hand was maintained with only a<10% lowering of the total visible reflectance (TVR). The same was true for the inventive coated fabric substrate of Invention Example 2 where the DVT was lowered by more than 50% compared to the DVT of the article of Comparative Example 1. In this instance, the WI and TVR were almost the same as the Comparative Example 1.

For the coated fabric substrate of Comparative Example 2 in which no i) porous particles were present, the DVT was reduced by less than 35%, in spite of the significantly larger amount of iv) white low-density particulate hydrated alumina used to replace the i) porous particles.

For the coated fabric substrate of Comparative Example 3 in which no porous particles were present, but only the equivalent amount of carbon black, the DVT was lowered as desired but so was the WI and the TVR to a visually noticeable extent compared to the coated fabric substrate of Invention Example 1.

For the coated fabric substrate of Comparative Example 4 where the carbon black level was lowered to match that in the coated fabric substrate of Invention Example 2, the WI and TVR values decreased with the DVT thereby showing an advantage for the presence of i) porous particles in a dry non-foamed light-attenuating coating.

The invention has been described in detail with particular reference to certain preferred embodiments thereof, but it will be understood that variations and modifications can be obtained within the spirit and scope of the invention.

The invention claimed is:

1. A method of making a coated fabric substrate, comprising:
    A) providing a fabric substrate comprising a plurality of core yarns, all woven together, wherein at least some of the plurality of core yarns comprise fiberglass, which fabric substrate has a first side and a second side; and
    B) forming a non-foamed light-attenuating coating on at least the first side of the fabric substrate from a non-foamed aqueous composition having a density of greater than 0.8 g/cm³, to provide the coated fabric substrate, which non-foamed light-attenuating coating, and comprises the components i) through iv):
        i) porous particles present in an amount of at least 0.5 weight % and up to and including 40 weight %, each porous particle comprising a continuous polymeric phase and discrete pores dispersed within the continuous polymeric phase, having a mode particle size of at least 2 μm and up to and including 50 μm, and
        optionally comprising an opacifying colorant in an amount of up to and including 1 weight %, the amount of the opacifying colorant being based on the total weight of the i) porous particles;
        ii) a film-forming binder material comprising at least a chlorinated polymer, which ii) film-forming binder material is present in an amount of at least 15 weight % and up to and including 50 weight %;
        iii) a white inorganic particulate filler material having a refractive index (RI) greater than 2 and a median particle size of less than 1 μm, the iii) inorganic particulate filler material being present in an amount of at least 8 weight % and up to and including 40 weight %; and
        iv) a white low-density particulate hydrated alumina having a median particle size of less than or equal to 3 μm, and being present in an amount of at least 10 weight % and up to and including 50 weight %,
    all amounts of the i), ii), iii), and iv) components being based on the total weight of the non-foamed light-attenuating coating.

2. The method of claim 1, wherein the non-foamed light-attenuating coating further comprises:
    v) a defoaming agent or an anti-foaming agent, or both, each of which is different from all of the i), ii), iii), and iv) components.

3. The method of claim 1, wherein the non-foamed light-attenuating coating further comprises:
    a flame retardant that is different from all of the i), ii), iii), and iv) components.

4. The method of claim 1, wherein the i) porous particles comprise the opacifying colorant in an amount of at least 0.1 weight % and up to and including 1 weight %, the amount being based on the total weight of the i) porous particles.

5. The method of claim 4, wherein the opacifying colorant is a carbon black and is present in the discrete pores of the i) porous particles.

6. The method of claim 1, wherein the ii) film-forming binder material is present in an amount of at least 20 weight % and up to and including 40 weight %, based on the total weight of the non-foamed light-attenuating coating.

7. The method of claim 1, wherein the chlorinated polymer comprises at least 5 weight % and up to and including 100 weight %, based on the total weight of the ii) film-forming binder material.

8. The method of claim 1, wherein the chlorinated polymer is selected from poly(vinyl chloride), a vinyl chloride-acrylic copolymer, poly(vinylidene chloride), and a combination of two or more of these polymeric materials.

9. The method of claim 1, wherein the iii) white inorganic particulate filler material is present in an amount of at least 15 weight % and up to and including 30 weight %, based on the total weight of the non-foamed light-attenuating coating.

10. The method of claim 1, wherein the iii) white inorganic particular filler material is selected from anatase titanium dioxide, rutile titanium dioxide, aluminum oxide, barium sulfate, zinc oxide, zinc sulfide, and a combination of two or more of these materials.

11. The method of claim 1, wherein the iv) white low-density particulate hydrated alumina is present in an amount of at least 20 weight % and up to and including 30 weight %, based on the total weight of the non-foamed light-attenuating coating.

12. The method of claim 1, comprising forming a non-foamed light-attenuating coating on only the first side of the fabric substrate.

* * * * *